United States Patent
Metzner

(10) Patent No.: US 9,889,514 B2
(45) Date of Patent: Feb. 13, 2018

(54) SPARK EROSION TOOL AND ELECTRODE FOR A SPARK EROSION TOOL

(71) Applicant: Schoeller-Bleckmann Oilfield Technology GmbH, Ternitz (AT)

(72) Inventor: Klaus Metzner, Wiener Neustadt (AT)

(73) Assignee: Schoeller-Bleckmann Oilfield Technology GmbH, Ternitz (AT)

( * ) Notice: Subject to any disclaimer, the term of this patent is extended or adjusted under 35 U.S.C. 154(b) by 1106 days.

(21) Appl. No.: 13/903,101

(22) Filed: May 28, 2013

(65) Prior Publication Data

US 2013/0319974 A1 Dec. 5, 2013

(30) Foreign Application Priority Data

Jun. 4, 2012 (AT) ................. A 640/2012

(51) Int. Cl.
| | |
|---|---|
| *B23H 7/12* | (2006.01) |
| *B23H 1/04* | (2006.01) |
| *B23H 9/14* | (2006.01) |
| *B23H 7/26* | (2006.01) |

(52) U.S. Cl.
CPC ............. *B23H 7/26* (2013.01); *B23H 1/04* (2013.01); *B23H 7/12* (2013.01); *B23H 9/14* (2013.01)

(58) Field of Classification Search
CPC ... B23H 1/04; B23H 7/12; B23H 7/26; B23H 9/14
See application file for complete search history.

(56) References Cited

U.S. PATENT DOCUMENTS

| | | | |
|---|---|---|---|
| 2,902,584 A | | 9/1959 | Ullmann |
| 4,101,405 A | * | 7/1978 | Inoue ........................ B23C 1/12 204/224 M |
| 4,470,896 A | * | 9/1984 | Petitimbert .............. B23H 1/10 204/279 |

(Continued)

FOREIGN PATENT DOCUMENTS

| | | |
|---|---|---|
| DE | 1 293 001 B | 4/1969 |
| JP | S43-32177 Y1 | 12/1968 |

(Continued)

OTHER PUBLICATIONS

Machine translation of Japan Patent document No. 10-315,056, Jul. 2016.*

(Continued)

*Primary Examiner* — Geoffrey S Evans
(74) *Attorney, Agent, or Firm* — Collard & Roe, P.C.

(57) ABSTRACT

A spark erosion tool includes an electrode arranged on a tool longitudinal axis and an electrode holder aligned along and arranged on the axis and connected to the electrode. The electrode holder includes a moving device for moving the electrode relative to the electrode holder and includes a press for applying pressure transversely to the axis in the area of an imaginary hose extending in the axis. The electrode holder has a cross section corresponding essentially to the electrode. An electrode for a spark erosion tool with a cylinder surface or a spherical surface includes a groove connected to a bore. A deflecting bore can be produced in a drill string part using the spark erosion tool. The deflecting bore is curved and connects two straight flushing bores.

27 Claims, 11 Drawing Sheets

(56) References Cited

U.S. PATENT DOCUMENTS

| | | | | |
|---|---|---|---|---|
| 4,855,557 A | * | 8/1989 | Denny | B23H 1/04 |
| | | | | 219/69.15 |
| 5,595,103 A | * | 1/1997 | Ecoff | B23H 7/26 |
| | | | | 91/51 |
| 6,225,589 B1 | | 5/2001 | Bartok | |
| 6,452,127 B1 | | 9/2002 | Higgins | |
| 8,321,133 B2 | | 11/2012 | Hsu et al. | |
| 2009/0134136 A1 | | 5/2009 | Graichen | |
| 2012/0006691 A1 | * | 1/2012 | Luo | B23H 3/04 |
| | | | | 205/645 |

FOREIGN PATENT DOCUMENTS

| | | | |
|---|---|---|---|
| JP | S58-217230 A | | 12/1983 |
| JP | 03-043122 A | * | 2/1991 |
| JP | H06-063231 U | | 9/1994 |
| JP | H07-51948 A | | 2/1995 |
| JP | 07-178625 A | * | 7/1995 |
| JP | H07-314258 A | | 12/1995 |
| JP | 08-309686 A | * | 11/1996 |
| JP | H08-309686 A | | 11/1996 |
| JP | H09-314421 A | | 12/1997 |
| JP | H10-118852 A | | 5/1998 |
| JP | 10-315056 A | * | 12/1998 |
| JP | H10-315056 A | | 12/1998 |
| JP | 2001-205523 A | * | 7/2001 |
| JP | 2001-205523 A | | 7/2001 |
| JP | 2003-089017 A | * | 3/2003 |
| JP | 2003-136343 A | | 5/2003 |
| JP | 2008302460 A | | 12/2008 |
| JP | 2011-502241 A | | 1/2011 |
| JP | 2008302461 A | | 3/2016 |
| WO | WO 00/54918 A1 | | 9/2000 |
| WO | 2009/055209 A2 | | 4/2009 |

OTHER PUBLICATIONS

Machine translation of Japan Patent document No. 2003-089,017, Jul. 2016.*

Machine translation of Japan Patent document No. 2001-205,523, Jan. 2017.*

* cited by examiner

SPARK EROSION TOOL AND ELECTRODE FOR A SPARK EROSION TOOL

CROSS REFERENCE TO RELATED APPLICATIONS

Applicant claims priority under 35 U.S.C. §119 of Austrian Application No. A 640/2012 filed on Jun. 4, 2012, the disclosure of which is incorporated by reference.

The invention relates to a spark erosion tool comprising an electrode arranged on a tool longitudinal axis and an electrode holder aligned along the tool longitudinal axis and arranged on the latter and connected to the electrode. The electrode holder comprises means for moving the electrode relative to the electrode holder. Furthermore, the invention relates to an electrode for a spark erosion tool and a method for producing a spark-eroded hole by means of a spark erosion tool of the said kind. The invention also relates to the use of such a spark erosion tool and a method for producing a deflecting bore in a drill string part, which connects two straight flushing bores with parallel axes and in particular flushing bores running in one axis.

Spark erosion tools of the said type are known in principle. For example JP 2001-205523 A shows a spark erosion tool with an electrode, which is secured to a spiral spring-like carrier or to a carrier which consists of a plurality of individual segments connected to one another by articulation. By means of this carrier the electrode can be pushed into a borehole and can also be deflected therein in order to produce curved bores.

Furthermore, JP 2003-136343 A shows a further spark erosion tool with an electrode which is secured to a carrier which consists of a plurality of individual segments joined together by articulation. By means of this tool curved and in particular also spiral-shaped bores can be produced.

Furthermore, WO 00/54918 A1 shows a spark erosion tool with an electrode, which is secured to a carrier made from a bendable material with a plurality of indentations.

Lastly, DE 129 3 001 B shows a spark erosion tool with an electrode, which is secured to a roller blind-like or roller shutter-like carrier. By means of this tool for example slots can be produced with a wave-like form.

Although the known spark erosion tools enable the production of curved recesses, the latter are adapted for a specific purpose. Furthermore, the known spark erosion tools can only be used for comparatively shallow bores.

Therefore, the objective of the invention is to provide an improved spark erosion tool, in particular one which can be used universally and specifically for deep bores. The objective of the invention is also to provide an improved method for the production of a spark-eroded hole. In particular, the method should be able to be used universally and enable the production of deeper bores.

The objective of the invention is achieved by means of a spark erosion tool of the aforementioned kind, in which the electrode holder comprises means for applying pressure acting transversely to the tool longitudinal axis in the area of an imaginary hose extending in the tool longitudinal axis with a cross section corresponding essentially to the electrode.

The objective of the invention is also achieved by a method for the production of a spark-eroded hole by means of an electrode arranged on a tool longitudinal axis and an electrode holder aligned along the tool longitudinal axis and arranged on the latter and connected to the electrode, comprising the steps:

a) fixing the electrode holder by applying pressure acting perpendicular to the tool longitudinal axis in an opening extending in the tool longitudinal axis, which has a cross section corresponding essentially to the electrode,
b) switching on the erosion voltage
c) moving the electrode relative to the electrode holder to a processing front,
d) switching off the erosion voltage
e) moving the electrode relative to the holder away from the processing front,
f) releasing the electrode holder by reducing said pressure acting transversely to the tool longitudinal axis,
g) moving the electrode holder in the direction of the processing front and repeating the steps a) to g).

Contrary to the known method for the production of a spark-eroded hole in the invention an electrode holder is fixed (in the borehole) and then the electrode is moved further away from this reference point. In this way the configuration of the bore can be influenced in a very flexible manner and the bore can be produced with small tolerances. In particular, the course of the bore can be corrected easily if the tool is meant to "run" in an unexpected manner. Overall the proposed spark erosion tool can thus be used in a much more universal manner than known spark erosion tools, mainly because with the presented spark erosion tool in principle very deep bores can be produced with any spatial course. For the sake of completion it should be noted finally that steps e) and g) in the aforementioned method can also be performed simultaneously and do not necessarily have to be performed consecutively.

A variant of the method for the production of a spark-eroded hole is advantageous if before step a) an auxiliary body with an opening extending in the tool longitudinal axis, which has a cross section corresponding essentially to the electrode, is fixed in the area of the hole to be produced, and the electrode holder is positioned in said opening with an electrode pointing towards the workpiece. In this way the spark erosion tool can be aligned before the actual boring process begins.

It is particularly advantageous if the produced processing contour following the spark erosion is processed further or finished by any machining or non-machining processing method. In this way for example micro-cracks which may be created by the spark can be removed and a particularly high-quality surface can be achieved.

The imaginary hose mentioned for the spark erosion tool (also imaginary tube or casing of a tube) coincides in the use of the spark erosion tool with the hole produced in the workpiece by the electrode. Alternatively or additionally the objective of the invention is therefore also achieved by a spark erosion tool of the aforementioned type, in which the electrode holder comprises means for applying pressure acting transversely to the tool longitudinal axis on the wall of a hole produced by the electrode.

In general, in the field of spark erosion the term "production of a bore" is used even though as a rule a rotating tool is not used and even though the material is not machined during the removal. Within the scope of the invention the terms "bore" and "hole" are therefore used synonymously. Furthermore, it should be noted that during the spark erosion the bore does not necessary have a circular cross section. For example, the bore can also have a polygonal or ellipsoid cross section. The aforementioned hose/the imaginary tube is then consequently a profile hose/a profile tube.

A further aspect of the objective of the invention is to provide an electrode for a spark erosion tool in which the pivoting of the latter about an axis of rotation arranged transversely to the tool longitudinal axis and thereby a change in the erosion direction can be performed particularly easily and also a greater removal of material is possible.

This aspect of the objective is achieved by an electrode for a spark erosion tool, in particular for a spark erosion tool of the aforementioned kind or as a component part thereof, comprising:
- a section facing a processing front with a cylindrical surface or a spherical surface,
- at least one groove arranged in this section, which runs from a central area of the section to the edge thereof and
- at least one bore, which connects a side of the electrode facing away from the processing front with the at least one groove.

In general, an electrode with a spherical section can be used universally, as the latter can be pivoted about any axis. An electrode with a cylindrical section is preferably used if the latter can only be pivoted about one axis of rotation, wherein the said axis of rotation and the axis of the cylinder are aligned parallel to one another or are identical. On the basis of the said measures the pivoting of the electrode about an axis of rotation arranged transversely to the tool longitudinal axis is made easier. In addition, the removed material can be taken away by means of a fluid supplied via the said bores and flowing through the groove, whereby a greater removal of material is made possible.

It is also advantageous in an electrode if the radius of the cylindrical or spherical section is smaller than or equal to the distance between the axis of rotation of the electrode and the surface of the cylindrical or spherical section. The electrode slides onto the latter during pivoting along an opening already formed in the workpiece, i.e. along its processing front. If the electrode can be displaced relative to the point of rotation along the tool longitudinal axis, the radius of the cylindrical or spherical section is preferably smaller than or equal to the smallest distance between the axis of rotation of the electrode and the surface of the cylindrical or spherical section.

It is also advantageous if the cylindrical or spherical section of the electrode in its edge area has a rounding extending at least up to the boundary of the processing front, which rounding has a radius which is smaller than the radius of the cylindrical or spherical section. In this way it is possible to produce curved bores without transverse grooves or with shallow transverse grooves.

Lastly, a further aspect of the objective of the invention is to provide an advantageous use of a spark erosion tool. In particular, an advantageous method is used for the production of a deflecting bore in a drill string part, which connects two straight flushing bores with parallel axes and in particular flushing bores running in one axis. In this way disadvantages relating to the mechanical and hydraulic properties of the drill string part are avoided which occur in the methods according to the prior art.

This aspect of the objective is achieved by a method for the production of a deflecting bore in a drill string part, which connects two straight flushing bores with parallel axes and flushing bores running in particular in one axis, wherein the deflecting bore is produced to run in a curve by spark erosion.

The mechanical and hydraulic properties of the drill string part are thereby improved overall.

In a particularly effective manner such a deflecting bore can be produced by using a spark erosion tool of the aforementioned kind, as a drill string part is usually several meters long and the flushing bores project suitably far into the drill string part. It is also possible by means of an electrode holder to fix the spark erosion tool securely deep inside a drill string part and to move the electrode within a narrow tolerance range.

Further advantageous configurations and developments of the invention are described in the subclaims and in the description in association with the Figures.

It is advantageous if the spark erosion tool comprises means for varying a cross section of the electrode holder transversely to the tool longitudinal axis. In this way different forms and/or sizes of the hole produced by the electrode can be balanced out when fixing the electrode holder.

It is advantageous in this connection if the means for varying a cross section of the electrode holder and for applying a pressure acting transversely to the tool longitudinal axis are formed by extendable and/or pivotable clamping elements/claws. In this way precise positioning is possible inside the bore. In particular, it is possible for the clamping elements/claws to be controlled individually for this purpose.

It is also advantageous in this connection if a housing of the electrode holder is elastic and the clamping elements/claws work through this housing. In this way the clamping elements/claws can be protected effectively from dirt.

It is also advantageous if the means for varying a cross section of the electrode holder and for applying a pressure acting transversely to the tool longitudinal axis are formed by a pneumatically or hydraulically activated bellows/expandable body. In this way the clamping can be performed over a relatively large area, whereby imprecisions in the surface of the bore, such as for example grooves and the like, do not affect the clamping effect significantly.

It is particularly advantageous if the electrode holder comprises means for its transportation. It is possible in this way to move the electrode holder within a bore without an externally guided linkage being necessary.

It is advantageous in this connection if the transport means are formed by driven wheels. In this way the electrode holder can be moved effectively in the bore. With a suitable configuration of the wheels the latter can also function as means for applying pressure acting transversely to the tool longitudinal axis on the wall of a hole produced by the electrode, so that the latter then have a dual purpose.

It is also advantageous if the electrode holder comprises at least two segments which can be moved against one another in the tool longitudinal axis, which segments comprise means for applying pressure acting transversely to the tool longitudinal axis or for varying the cross section of the electrode holder. In this variant the electrode holder has a front and a rear segment, which are fixed alternately in the bore made through the electrode. Between the alternate fixing the distance between the two segments is increased or reduced, so that the electrode holder can move in the bore.

It is advantageous if the spark erosion tool has a bendable, rod-like or tubular feed body aligned along the tool longitudinal axis, which is connected to the electrode holder. In this way the electrode holder can be moved inside the bore without the latter also having to have a separate drive. The structure of the spark erosion tool is thus particularly simple.

It is advantageous in this connection if the feed body comprises a plurality of rigid segments arranged along the tool longitudinal axis, which are connected movably to one another. In this way the feed body can have a robust structure, i.e. with segments made from a resistant and hard material, but remains movable.

It is an advantage if the segments are connected rotatably to one another via axes of rotation aligned transversely to the tool longitudinal axis, in particular if all axes of rotation are aligned normally to the tool longitudinal axis and parallel to one another, or all axes of rotation are aligned normally to the tool longitudinal axis, wherein two adjacent axes of rotation are rotated respectively about an angle α. In the first variant the feed body can thus be moved in one plane. This is thus suitable for bores which run in one plane. The second variant is also suitable for spatially running bores. In particular, the axes of rotation can be rotated respectively by 90°, so that the feed body is composed of a series of cardanically connected segments. If the angle α is less than 90°, such a feed body can be used in particular for the production of helically running bores.

It is advantageous if the feed body has a constant length along the tool longitudinal axis. In this way the electrode holder fixed to the feed body or also the electrode can be moved effectively in the borehole, as a displacement of the feed body corresponds essentially to a displacement of the electrode holder or also the electrode.

It is also advantageous if the electrode can be moved relative to the electrode holder in the tool longitudinal axis and/or transversely thereto. In this way on the one hand an advancing movement of the electrode is possible and on the other hand a movement to deflect the path of the bore is also possible.

It is also advantageous if the electrode can be rotated relative to the electrode holder, wherein the axis of rotation is aligned transversely to the tool longitudinal axis. In this way the electrode can be pivoted out of the axis of the (already existing) bore, in order to obtain a curved path of the additional bore.

It is also advantageous if the electrode can be rotated relative to the electrode holder, wherein the axis of rotation is aligned parallel to the tool longitudinal axis or coincides with the latter. In this way bores can be produced with a non-circular cross section for example, the cross-sectional form of which rotates helically along the longitudinal axis of the bore. In addition, it is also possible to rotate a pivot mechanism for the electrode in a predefinable direction, in order to deflect the bore in a desired manner. Lastly, it is also an advantage to rotate the electrode about an axis of rotation which is aligned parallel to the tool longitudinal axis or coinciding with the latter, if the electrode on the side facing the processing front comprises grooves for flushing out removed material. By means of the said rotation the material can be removed evenly despite the grooves in the electrode.

It is also advantageous if the means for moving the electrode relative to the electrode holder are formed by at least one actuator connected to the electrode selected from a group comprising a pneumatic actuator, hydraulic actuator, piezo-actuator, electromechanical actuator—a linear or rotation motor respectively. In this way tried and tested means are provided for moving the electrode. The spark erosion tool can thus be realized with comparatively little effort.

It is advantageous if the means for moving electrode relative to the electrode holder are formed by cable pulls which are connected to the electrode. In this way it is possible to control the electrode outside the borehole with only a small amount of technical input.

It is advantageous if the spark erosion tool comprises trailing lines arranged in the area of the tool longitudinal axis and connected to the electrode holder, which are used for supplying electricity to the electrode and/or power to the electrode holder and/or for transmitting control signals to the electrode holder. In particular, the trailing lines can be formed by an electric cable and by hoses of a pneumatic or hydraulic system. In this way the power required for operating the spark erosion tool can be conveyed in a simple manner to the electrode holder. In addition, it is possible to influence the boring process externally if the lines are also used for transmitting control signals to the electrode holder.

Lastly, it is particularly advantageous if a housing of the electrode holder is flexible and the internal structure thereof comprises a plurality of rigid segments which can be moved relative to one another and in which the means are arranged for applying pressure acting transversely to the tool longitudinal axis and/or the means for moving the electrode relative to the electrode holder and/or a control of the said means, in particular an electronic control. In this way the electrode holder can be adjusted particularly effectively to the path of the bore. However, the use of (generally) rigid standard components is possible for the internal structure. For example, said drive motors comprise circuit boards with control and/or communication units arranged thereon. Instead of the hose-like housing the latter can also be formed by a plurality of articulated rigid segments. As the boundaries to the feed body are fluid here a strict division into a feed body and electrode holder is not always justified. Therefore, it is also possible that the latter form more or less one structural unit.

For a better understanding of the invention the latter is explained in more detail with reference to the following Figures. In the latter FIG. 1 shows a schematic representation of a spark erosion tool with extendable plates in the electrode holder;

Figure 1:
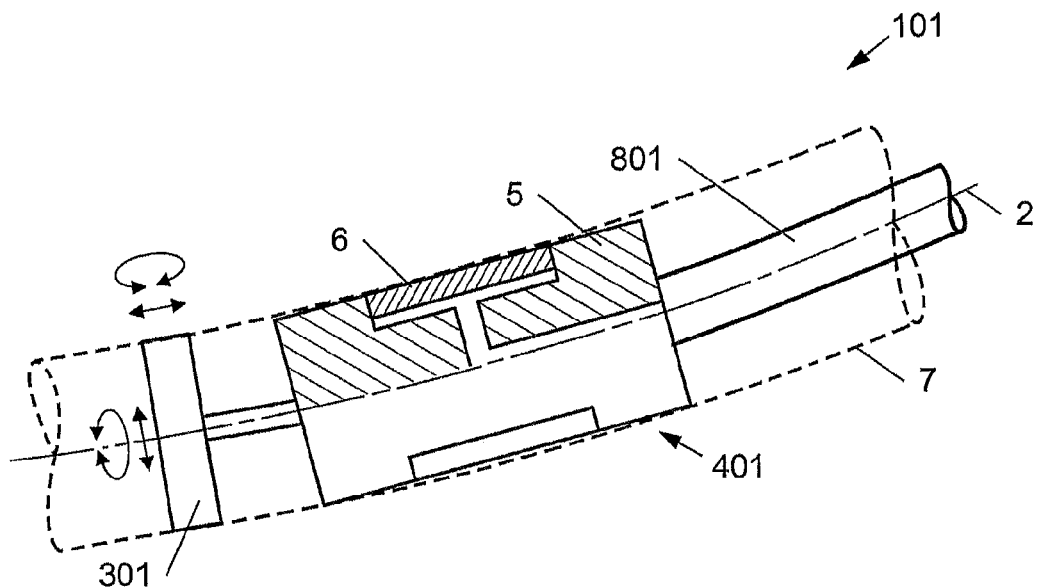

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position. Furthermore, also individual features or combinations of features from the various exemplary embodiments shown and described can represent in themselves independent or inventive solutions.

FIG. 1 shows schematically a first variant of a spark erosion tool 101, comprising an electrode 301 arranged on a tool longitudinal axis 2 and an electrode holder 401 aligned along the tool longitudinal axis 2 and arranged on the latter and connected to the electrode 301. The electrode holder 401 comprises means not shown in more detail in FIG. 1 for moving the electrode 301 relative to the electrode holder 401.

In principle, movements of the electrode 301 relative to the electrode holder 401 are possible in all six degrees of freedom, that is movements in the x, y and z-axis and rotations about the said axes. FIG. 1 illustrates some of these possibilities with arrows.

The electrode holder 401 also comprises means 6 for applying pressure acting transversely to the tool longitudinal axis 2 in the area of an imaginary hose 7 extending in the tool longitudinal axis 2 with a cross section corresponding essentially to the electrode 301. Said imaginary hose 7 is shown by dashed lines in FIG. 1. Equally the imaginary hose can also be in the form of an imaginary tube or casing of a tube. If the spark erosion tool 101 is in operation the said hose 7 coincides with the bore produced by the electrode 301 (cf. for example also FIG. 26).

The means for applying a pressure acting transversely to the tool longitudinal axis 2 are formed in this example specifically by plates 6, which are mounted in a base body 5, whereby a pneumatically or hydraulically activated actuator is formed. If the pressure in the hollow chamber in the base body 5 is increased, the plates 6 are pushed accordingly outwards. In addition the plates 6 can also be used for varying the cross section of the electrode holder transversely to the tool longitudinal axis 2, in that they are extended or retracted. In this way tolerances of the hole produced in the electrode 301, or also the bending thereof can be compensated for. For example three plates 6 can be distributed offset by 120° respectively over the circumference of the base body 5.

Figure 2:
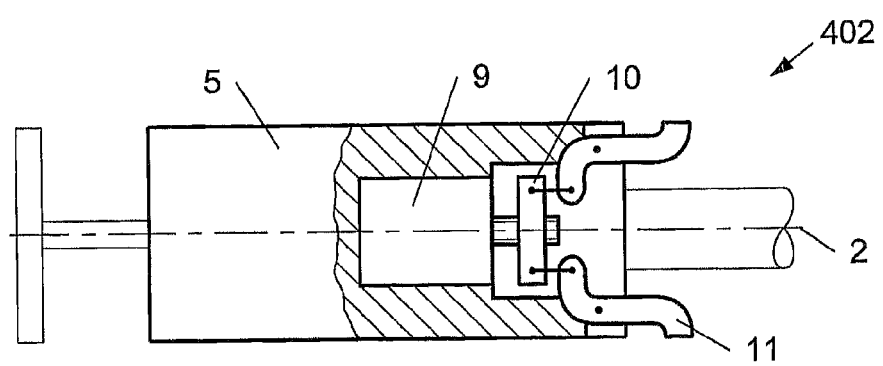
FIG. 2 shows a schematic representation of an electrode holder with pivotable claws.

FIG. 2 shows a further schematically represented variant of an electrode holder 402, in which the means for varying a cross section of the electrode holder 402 and for applying a pressure acting transversely to the tool longitudinal axis 2 are formed by pivotable claws 11. To move the latter a motor 9 mounted in the base body 5 is activated, whereby the spindle nut 10 is displaced axially by the rotating spindle. By means of levers said movement is transmitted to the claws 11, which can be pivoted in or out accordingly. For example three claws 11 can be offset respectively by 120° distributed over the circumference of the base body 5.

Figure 3:
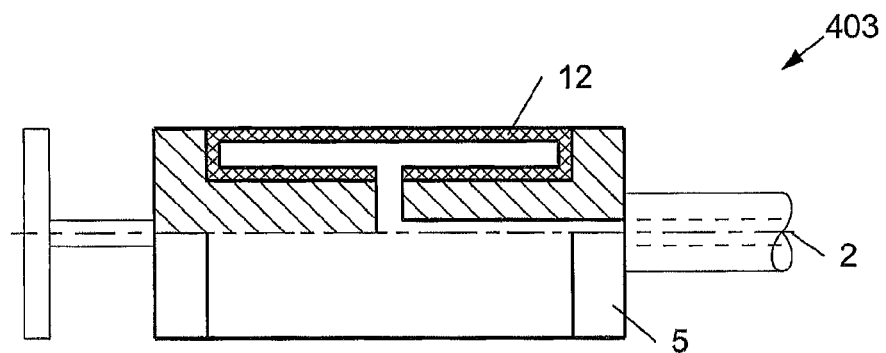
FIG. 3 shows a schematic representation of an electrode holder with a bellows/expandable body for fixing the electrode holder.

FIG. 3 shows a further schematic variant of an electrode holder 403, wherein the means for varying a cross section of the electrode holder 403 and for applying a pressure acting transversely to the tool longitudinal axis 2 are formed by a pneumatically or hydraulically operated bellows/expandable body 12. The latter is made from an elastic material, so that it curves outwards, when the pressure is increased on the inside. In this way the electrode holder 403 can be clamped in a bore.

Figure 4:
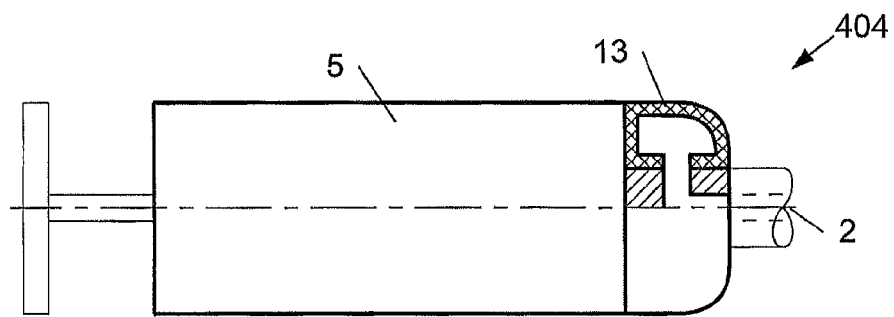
FIG. 4 is as FIG. 3 only with a rearwards arranged bellows/expandable body.

FIG. 4 shows a variant of an electrode holder 404, which is very similar to the electrode holder 403. In contrast the bellows/expandable body 13 is now arranged in the rear section of the electrode holder 404. Of course, the bellows/expandable body 13 could also be arranged in the front section of the electrode holder 404. This also applies to other means for varying a cross section of the electrode holder and for applying a pressure acting transversely to the tool longitudinal axis 2, in particular also for the claws 11 shown in FIG. 1, which could also be arranged in a middle or front section of the electrode holder 402.

Figure 5:
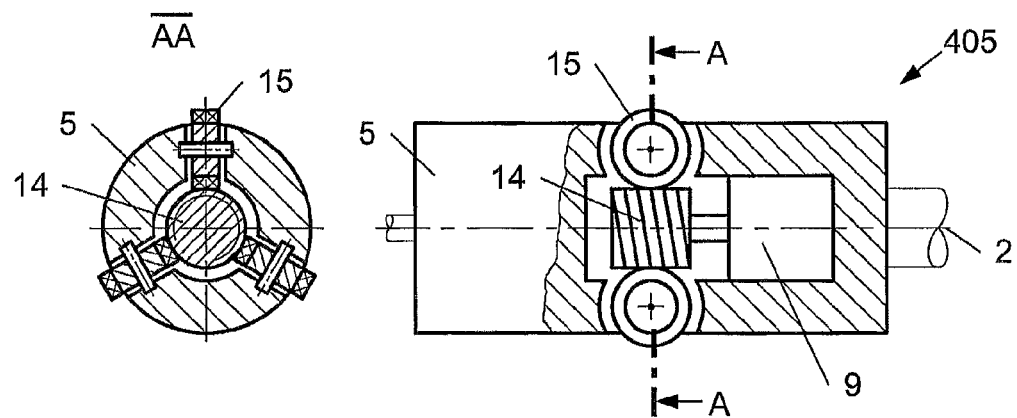
FIG. 5 shows a schematic representation of an electrode holder with driven wheels.

FIG. 5 shows a schematic variant of an electrode holder 405, which comprises means for its transportation (left in cross section, right in longitudinal section). Said means in the present example are formed specifically by driven wheels 15. The latter have a rubberized surface, into which a spindle 14 driven by a motor 9 engages or is pressed. In this way on rotation of the spindle 14 the wheels 15 are also set into rotation, whereby the electrode holder 405 can be moved back and forth in the bore. By means of the rubberized surface the wheels 15 are used at the same time as means for applying pressure acting transversely to the tool longitudinal axis 2. When the motor 9 is deactivated, the electrode holder 405 is fixed in the bore, as the wheels 15 can no longer rotate because of the self-locking of the spindle 14. The wheels 15 are thereby multi-purpose.

Figure 6:
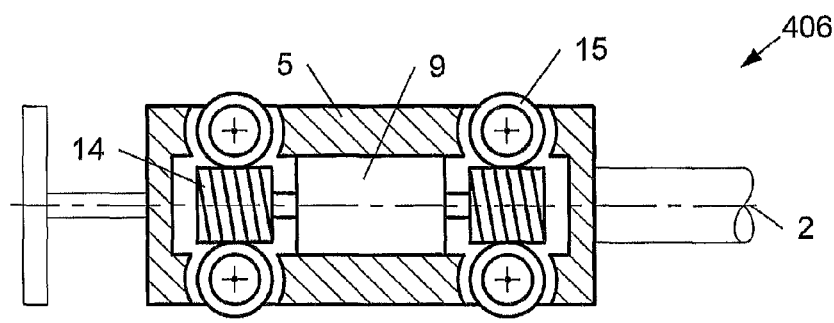
FIG. 6 is as FIG. 5 only with wheels arranged at the front and rear.

FIG. 6 shows a variant of an electrode holder 406, which is very similar to the electrode holder 405. In contrast however the electrode holder 406 comprises wheels 15 at its front and rear end.

Figure 7:
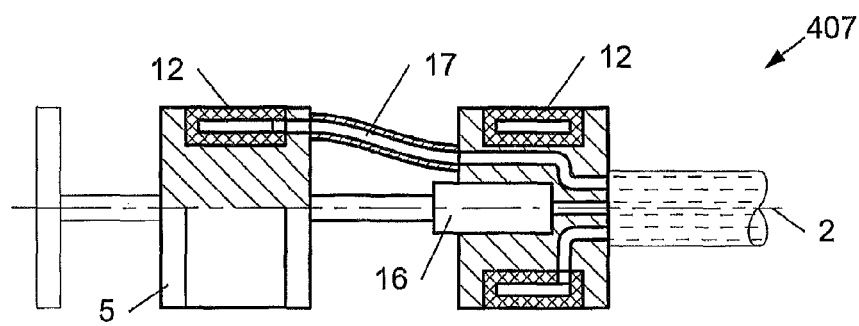
FIG. 7 shows a schematic representation of an electrode holder with two segments which can be moved relative to one another and can be fixed independently of one another.

FIG. 7 shows a schematically depicted variant of an electrode holder 407, which comprises two segments movable against one another in the tool longitudinal axis 2, which segments comprise respectively means 12 for applying pressure acting transversely to the tool longitudinal axis 2 or for varying a cross section of the electrode holder 407. In particular, separately controllable bellows/expandable body 12 can be arranged on the two segments which can be moved against one another by means of a hydraulic/pneumatic cylinder 16. To clamp the electrode holder 407 both bellows/expandable bodies 12 are activated. For the transportation of the latter one of the two bellows/expandable bodies 12 is released and then the released segment displaced by means of the hydraulic/pneumatic cylinder 16 relative to the also fixed segment. Then the previously released segment is fixed and the other released and the two segments are displaced against one another. In order to move the electrode holder 407 in FIG. 7 for example from right to left the left segment is fixed and the right one is released. The distance between the two is reduced so that the right segment moves to the left. In a further step the left segment is released and the right one is fixed, whereupon the spacing of the segments is increased and also the left segment is moved to the left. By repeating the said steps the electrode holder 407 can be moved in the bore.

Figure 8:
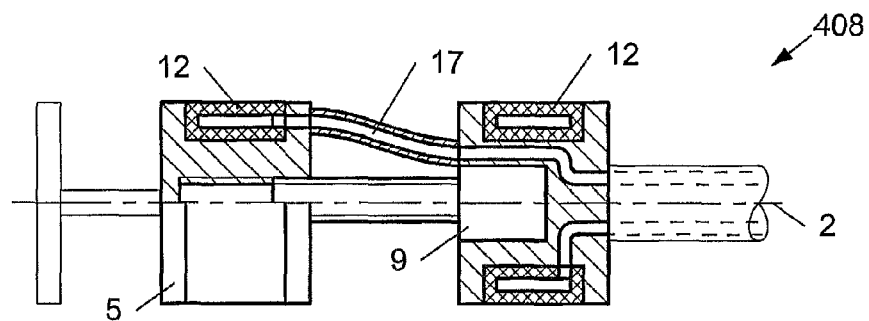
FIG. 8 is as FIG. 7 only with a spindle drive instead of the hydraulic/pneumatic cylinder.

FIG. 8 shows a variant of an electrode holder 408, which is very similar to the electrode holder 407. Instead of the hydraulic/pneumatic cylinder 16 however in one segment an electric motor 9 is provided with a spindle, which engages with the other segment. By activating the electric motor 9 the two segments can be displaced against one another. For correct functioning an anti-rotation means not shown in FIG. 8 between the two segments is an advantage.

Figure 9:
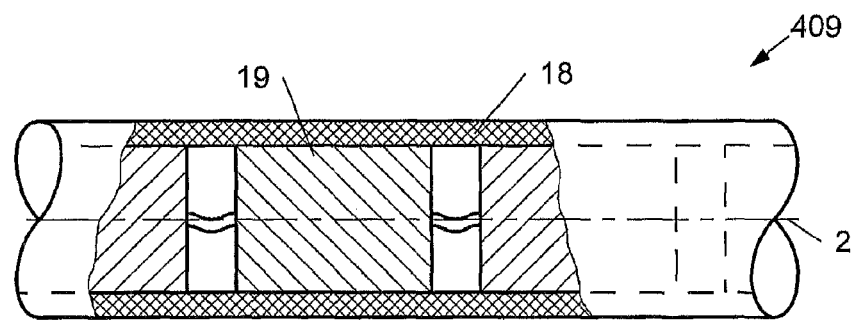
FIG. 9 shows a schematic representation of an electrode holder with a flexible housing and a segmented inner structure.

FIG. 9 shows a schematically depicted variant of an electrode holder 409, the housing 18 of which is flexible and the inner structure of which comprises a plurality of rigid segments 19 which can be moved relative to one another. In said segments 19 for example means 6, 11, 12, 13, 15 are arranged for applying a pressure acting transversely to the tool longitudinal axis 2 and/or means for moving the electrode 301 relative to the electrode holder 409 and/or a control of the said means, in particular an electronic control. As shown in FIG. 9, the individual segments 19 can if necessary be connected by flexible cables. In this way the electrode holder 409 can adapt itself particularly well to the path of the bore. However, the use of (generally) rigid standard components is possible for the inner structure. For example the latter comprise drive motors and circuit boards with control and/or communication units arranged thereon.

Figure 10:
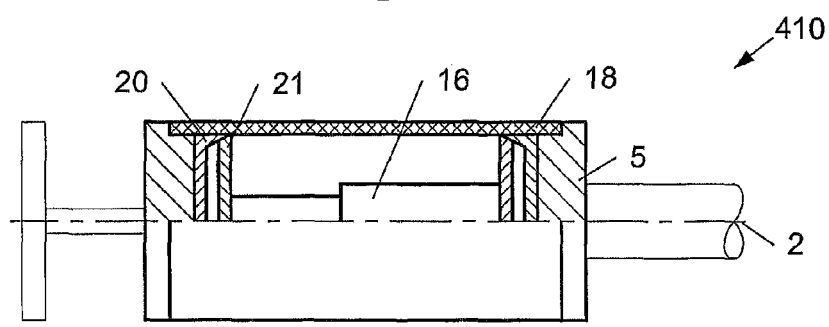
FIG. 10 shows a schematic representation of an electrode holder with clamping elements/claws, which are arranged underneath an elastic housing.

FIG. 10 shows a further schematically depicted variant of an electrode holder 410, the housing 18 of which is also flexible. On the inside two clamping rings 20 are arranged with hook-like extensions and two activating rings 21. By activating the hydraulic/pneumatic cylinder 16 the two activating rings 21 are pressed against the clamping rings 20, whereby the hook-like extensions are pressed outwardly owing to the beveling of the two rings 20, 21. This force effect is guided through the flexible housing 18, whereby the electrode holder 410 can be fixed in the bore made through the electrode. Of course, the shown mechanism with the two rings 20 and 21 can also be used without a flexible housing 18, if the hook-like extensions project for example through openings in a (rigid) housing. Conversely, the clamping mechanisms shown in FIGS. 1 and 2 can also be used in connection with a flexible housing.

Figure 11:
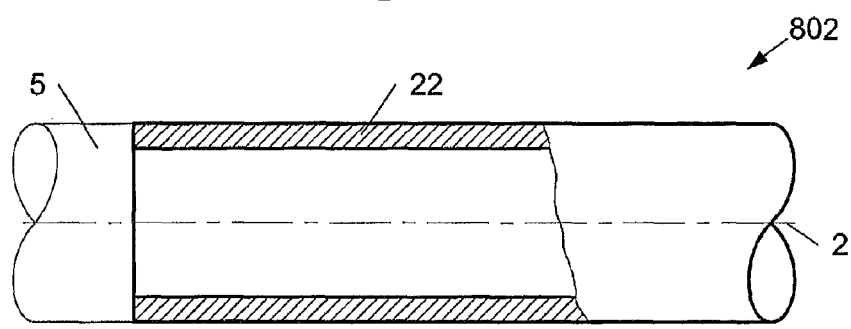
FIG. 11 shows an example of a feed body, which is formed by a bendable hose.

FIG. 11 shows a schematically depicted variant of a feed body 802, at the left end of which a base body 5 of an electrode holder not shown in detail is secured, and which is formed essentially by an elastic hose 22. The latter can be made for example from flexible plastic. Equally instead of the hose 22 a flexible rod can also be used. As the boundaries to the electrode holder are fluid here, in particular in connection with the variant shown in FIG. 9, a strict division between the feed body and electrode holder is not always justified. Therefore, it is also conceivable that the latter form more or less one structural unit.

Figure 12:
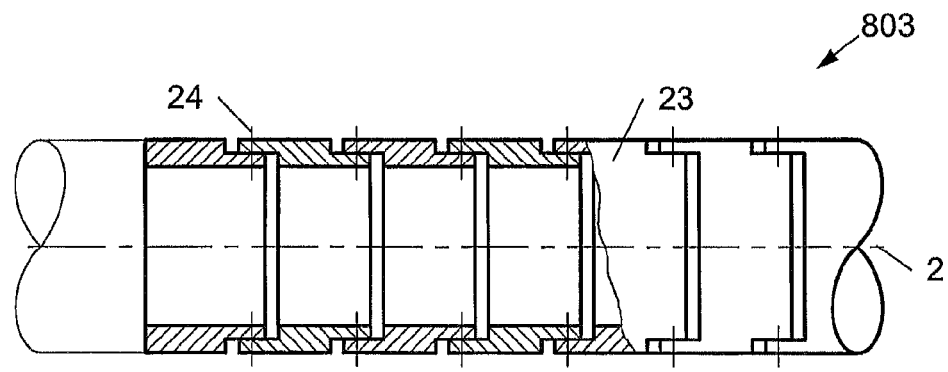
FIG. 12 shows a further example of a feed body, which is formed by a plurality of moveable connected segments.

FIG. 12 shows a further schematically depicted variant of a feed body 803, which comprises a plurality of rigid segments 23 arranged along the tool longitudinal axis 2, which are connected together movably. In particular, the segments 23 in this example are connected rotatably via axes of rotation 24 aligned transversely to the tool longitudinal axis 2, which are aligned normally to the tool longitudinal axis 2 and parallel to one another. In this way the feed body 803 can be moved in one plane. Advantageously the feed body 803 along the tool longitudinal axis 2 has a constant length (without taking into consideration the bearing play), so that a displacement thereof immediately affects the electrode holder 400 . . . 410. Of course, the feed body 802 of FIG. 11 can also be configured so that it has a constant length along the tool longitudinal axis 2.

Figure 13:
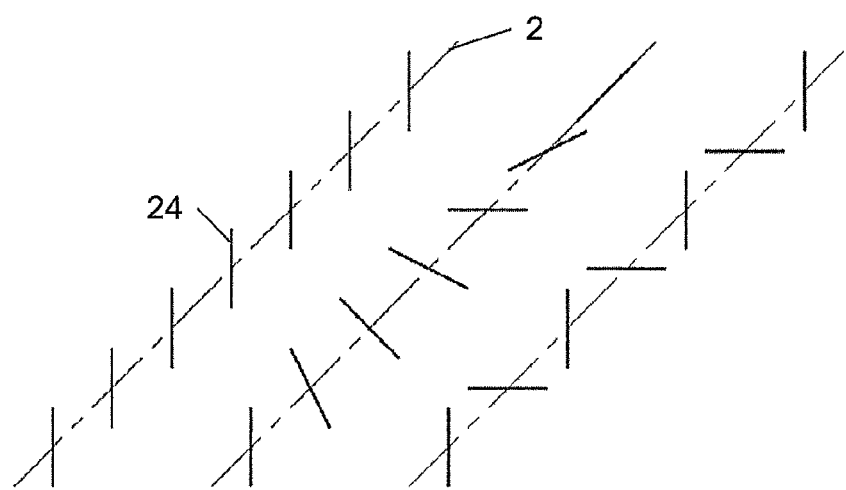
FIG. 13 shows examples for the arrangement of the axes of rotation of the feed body shown in FIG. 12.

FIG. 13 shows various ways in which the axes of rotation 24 of the feed body 803 can be aligned. On the left side axes of rotation 24 are shown again normally to the tool longitudinal axis 2 and parallel to one another. In the middle two adjacent axes of rotation 24 are rotated respectively by an angle α. In this way an advance body configured in this way is suitable, in particular, for bores running along a helical line. On the right the angle α=90° is selected so that two adjacent axes of rotation 24 are normal to one another respectively. The segments 24 are then connected cardanically so that the feed body can be guided in generally spatially running bores.

Furthermore, in both feed bodies 802, 803 trailing lines connected to the electrode holder 401 . . . 410 can be arranged, which are used for supplying power to the electrode 301 and/or for the power supply to the electrode holder 401 . . . 410 and/or for transmitting control signals to the electrode holder 401 . . . 410. In particular, the trailing lines can be formed by an electric cable. Of course, such trailing lines can also be provided without a feed body 801 . . . 803 if the electrode holder 401 . . . 410 has its own drive, as shown for example in FIGS. 5 to 8.

Lastly, it should be noted at this point that the electrode holder 409 shown in FIG. 9 can be configured similarly to the feed body 803, that is its housing is formed by a plurality of movably connected segments. It is advantageous in this case if the housing is segmented in the same way as the inner structure of the electrode holder. In this case the outer housing of the electrode holder can be formed by the housing of the segments 19. Also in this case a strict division into a feed body and electrode holder cannot be justified.

Figure 14:
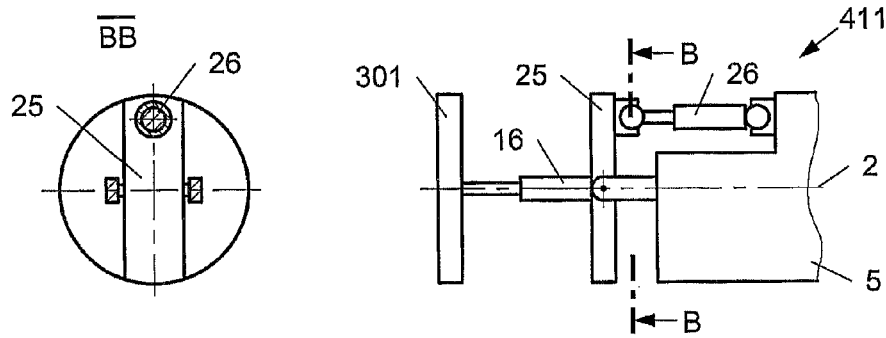
FIG. 14 shows a schematic representation of an electrode holder with a serial kinematic system for moving the electrode.

FIG. 14 shows a schematically depicted variant of an electrode holder 411, which has a serial-kinematic movement mechanism for the electrode 301. In particular, said movement mechanism comprises a rotatably mounted plate 25, which can be deflected by a hydraulic/pneumatic cylinder 26 and a hydraulic/pneumatic cylinder 16 for displacing the electrode 301 in the tool longitudinal axis 2. With regard to the hydraulic/pneumatic cylinders 16 and 26 it should be noted that the hydraulic/pneumatic cylinder 26 is articulated and thus cannot perform a guiding function.

The hydraulic/pneumatic cylinder 16 can however perform such a guiding function as it is rigidly connected to the electrode 301 and the rotatably mounted plate 25. In this way the electrode 301 can run in the tool longitudinal axis 2 and be pivoted out of the latter and thereby moved transversely to the tool longitudinal axis 2 and rotated about an axis of rotation aligned transversely to the tool longitudinal axis 2. In this way bores running in one plane can be produced. To produce spatially running bores the feed body 5 has to be rotated accordingly or the shown mechanism has to be combined for example with the mechanism shown in FIG. 19.

Figure 15:
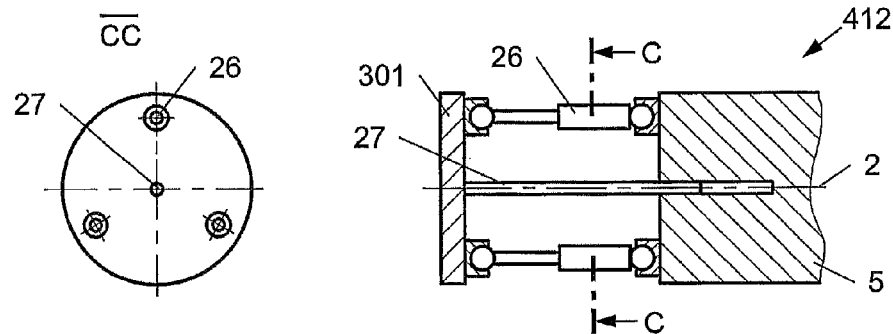
FIG. 15 shows a schematic representation of an electrode holder with a parallel kinematic system for moving the electrode.
Figure 16:
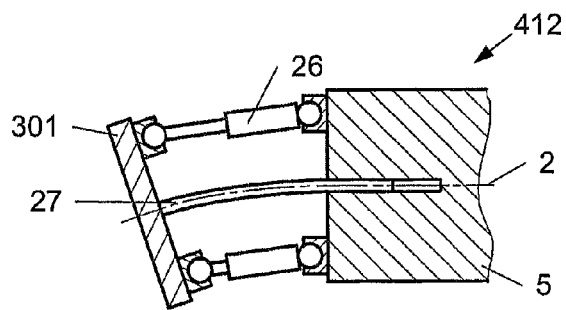
FIG. 16 is as FIG. 15 but with pivoted electrode.

FIG. 15 shows a further schematically depicted variant of an electrode holder 412, which comprises a parallel kinematic movement mechanism for the electrode 301. In this case the electrode 301 is connected to the base body 5 by three articulated hydraulic/pneumatic cylinders 26. In addition, the electrode 301 is also guided by a guiding rod 27. The latter is not rigid but has a certain degree of flexibility, so that the electrode can be deflected as shown in FIG. 16. A particularly advantageous aspect of this variant is that the bendable guiding rod 27 automatically provides a deflection of the tool longitudinal axis 2 in a circular orbit. By means of a suitable control of the hydraulic/pneumatic cylinder 26 the electrode 301 can thus be moved along any circular orbit and of course can also be moved in a straight line. On the basis of the parallel kinematic drive the electrode 301 can also be deflected in any direction, without the base body 5 having to be rotated for this or without requiring a rotary mechanism as shown in FIG. 19.

Figure 17:
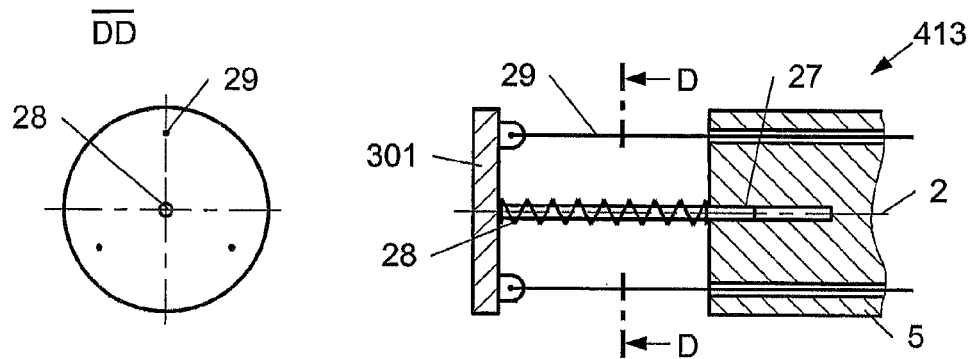
FIG. 17 is as FIG. 15 but with cable pulls instead of hydraulic/pneumatic cylinders.

FIG. 17 shows a variant of an electrode holder 413 which is very similar to electrode holder 412. Instead of the hydraulic/pneumatic cylinder 26 the electrode 301 is controlled by means of cable pulls 29. To enable the longitudinal displacement and deflection of the electrode 301 the flexible guiding rod 27 is surrounded by a compression spring 28 which causes pretensioning between the electrode 301 and base body 5.

Figure 18:
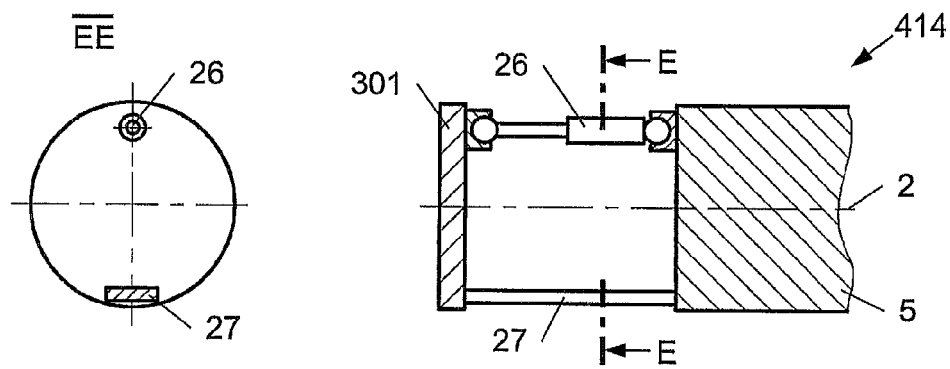
FIG. 18 shows a schematic representation of an electrode holder with a pivoting mechanism for a pivot movement of the electrode in one plane.

FIG. 18 shows a further schematically depicted variant of an electrode holder 414, which comprises a hydraulic/pneumatic cylinder 26 for the movement of the electrode 301. In this example the electrode can only be pivoted in one plane out of the tool longitudinal axis 2, as the guiding rod 27 does not allow any longitudinal displacement. The latter can be brought about in this variant for example by a feed body 801 . . . 803. The deflection of the electrode along a circular orbit is also advantageous here.

Figure 19:
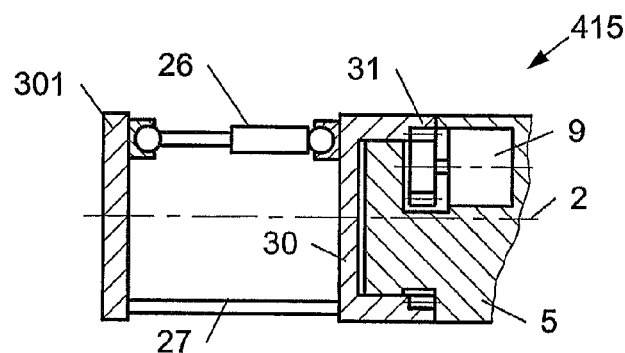
FIG. 19 is as FIG. 18 but extended with a rotary drive for the electrode.

FIG. 19 shows a variant of an electrode holder 415, which is very similar to the electrode holder 414. In this example however the hydraulic/pneumatic cylinder 26 is not fixed to the base body 5, but can be rotated by a sleeve 30, which can be rotated by a pinion 31 driven by a motor 9 about the tool longitudinal axis 2. In this way in turn a serial kinematic movement mechanism is provided which enables the deflection of the electrode 301 in any direction.

Figure 20:
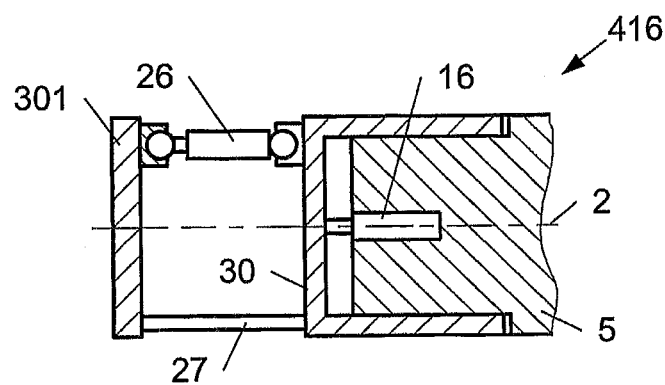
FIG. 20 is as FIG. 18 but extended with a linear feed for the electrode.

FIG. 20 shows a further variant of an electrode holder 416, which is very similar to the electrode holder 414. In this example however the hydraulic/pneumatic cylinder 26 is not firmly connected to the base body 5, but to a sleeve 30, which can be displaced via a hydraulic/pneumatic cylinder 16 along the tool longitudinal axis 2. In this way a longitudinal feed of the electrode 301 can be performed without the base body 5 or a feed body 801 . . . 803 having to be moved. A particularly advantageous variant of an electrode holder is achieved if the teaching disclosed in FIG. 19 is combined with the teaching disclosed in FIG. 20. In this case it is possible to move the electrode 301 along any circular orbit and of course also in a straight line.

Figure 21:
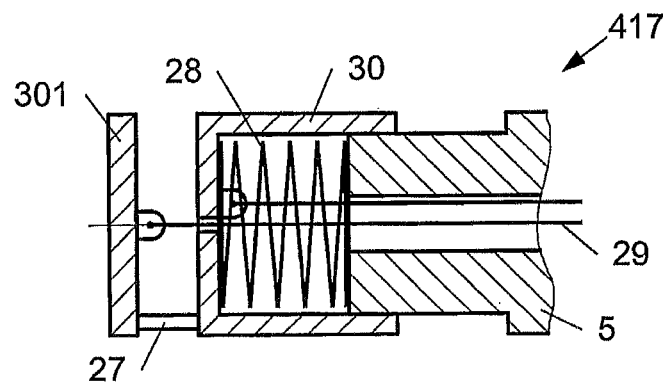
FIG. 21 is as FIG. 20 but with cable pulls instead of hydraulic/pneumatic cylinders.

FIG. 21 shows a variant of an electrode holder 417, which is very similar to the electrode holder 416. Instead of the hydraulic/pneumatic cylinder 16 and 26 in this example all cable pulls 29 are provided in order to move the electrode 301.

In general, the teaching disclosed in the different Figures can be combined in any way. For example it is easily possible to combine the claws 11 disclosed in FIG. 2 with an arrangement according to FIG. 15. It would also be possible to extend FIG. 1 with the drive from FIG. 5 etc. The shown embodiment variants should therefore not be considered conclusive but simply an illustrative list of possibilities, which can be used individually but also combined in a modular way like a construction kit.

In particular, it should also be noted at this point that the shown actuators are only used for illustrating the functional principle of the spark erosion tool and are interchangeable as desired. For example, the means 9, 16, 26, 29 for moving the electrode 301 relative to the electrode holder 401 . . . 417 can be formed by at least one actuator connected to the electrode 301 from a group comprising a pneumatic actuator, hydraulic actuator, piezo-actuator, electromechanical actuator—as a linear or rotational motor respectively. Instead of a spindle drive in the above representations therefore for example also a pneumatic or hydraulic actuator can be used and vice versa. In general, actuators of any kind can be used to enable the movement of the spark erosion tool.

Of course, also all means for varying a cross section of the electrode holder and for applying pressure acting transversely to the tool longitudinal axis 2 can be controlled in any manner, in particular electrically, hydraulically, pneumatically or mechanically (e.g. by means of cable pulls). For example, the electrically driven claws 11 depicted in FIG. 1 could also be moved by a pneumatic or hydraulic linear motor. In particular, it is also possible that the claws 11 are operated by means of cable pulls, which are guided outwardly behind the spark erosion tool by the already produced hole. In a similar way for example the clamping shown in FIG. 10 could also be performed by cable pulls or also an electric drive. The examples are of course given solely by way of example. Of course, other variants of the spark erosion tool can be equipped with drives differing from the respective representation.

FIGS. 22 to 26 depict an advantageous method for the production of a spark-eroded hole by means of a spark erosion tool according to the invention.

Figure 22:
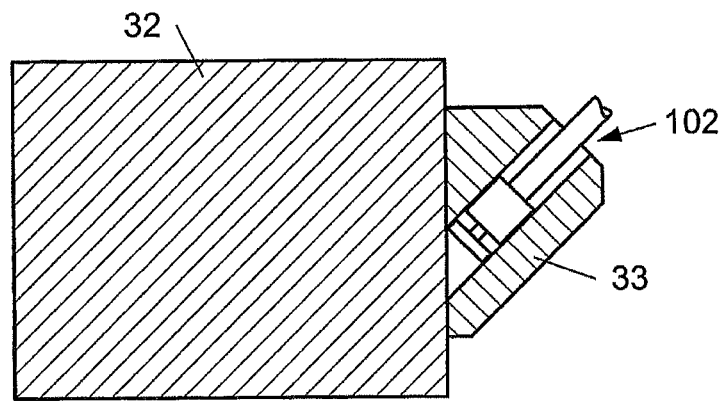
FIG. 22 shows a workpiece prior to processing with a spark erosion tool.
Figure 23:
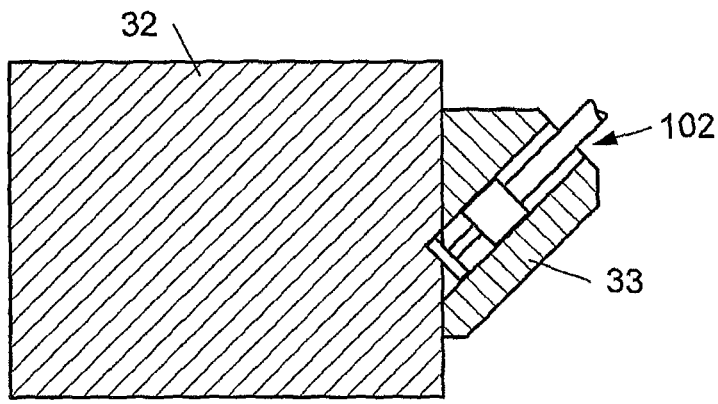
FIG. 23 is as FIG. 22 but with an extended electrode of the spark erosion tool.
Figure 24:
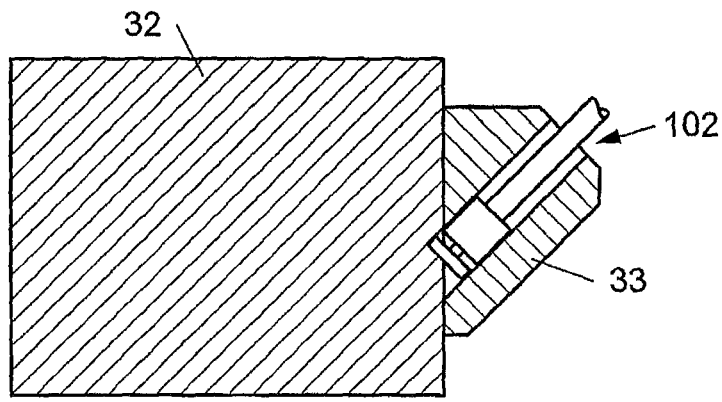
FIG. 24 is as FIG. 23 but with the electrode holder moved further.
Figure 25:
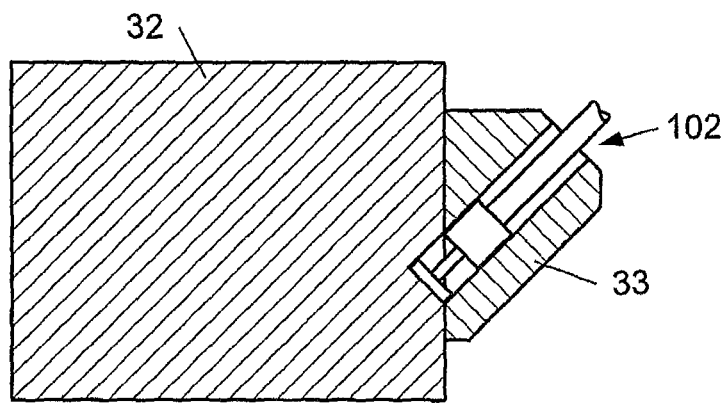
FIG. 25 is as FIG. 24 but with an extended electrode.
Figure 26:
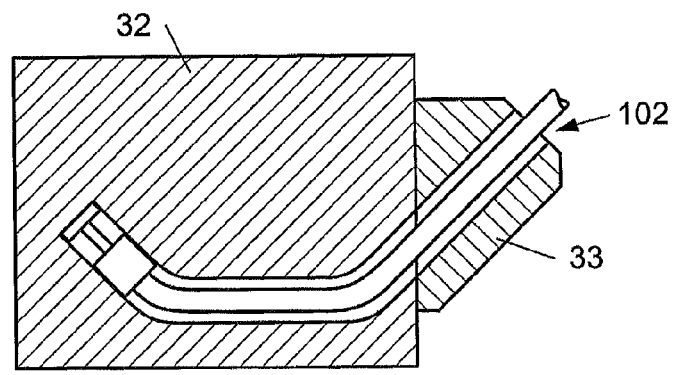
FIG. 26 shows the workpiece with a deeply penetrating spark erosion tool.

In FIG. 22 an auxiliary body 33 with an opening extending in the tool longitudinal axis 2, which opening has a cross section corresponding essentially to the electrode 301, is fixed in the area of the hole to be produced onto the workpiece 32. Then the electrode holder 401 . . . 417 is positioned in the said opening with electrode 301 pointing towards the workpiece 32 and fixed into the auxiliary body 33 in step a) by applying a pressure acting transversely to the tool longitudinal axis 2. In an further step b) the erosion voltage is switched on and the electrode 301 is moved in a further step c) towards the processing front. FIG. 23 shows the electrode 301, which has been moved out relative to the electrode holder 401 . . . 417. In a further step d) the erosion voltage is switched off and in a subsequent step e) the electrode 301 is moved relative to the electrode holder 401 . . . 417 away from the processing front. In a further step f) the electrode holder 401 . . . 417 is released by reducing the pressure acting transversely to the tool longitudinal axis 2 and in step g) is moved in the direction of the processing front. This position is shown in FIG. 24. Then steps a) to g) are repeated until the bore has been completed. FIG. 25 also shows the state after the electrode 301 has been forced further into the workpiece 32 relative to the state shown in FIG. 24 with a fixed electrode holder 401 . . . 417. Lastly, FIG. 26 shows a state in which the spark erosion tool has been advanced relatively far into the workpiece 32. After the spark erosion the produced processing contour can be processed further or finished in a further processing step by any machining or non-machining process, in order to improve the surface of the bore and in particular also to remove micro-tears caused by the spark erosion. Finally, it should be noted that the use of an auxiliary body 33 is only an optional advantageous measure but is not essential for the described method. Of course, the spark erosion tool can also be guided in a different way.

Figure 27:
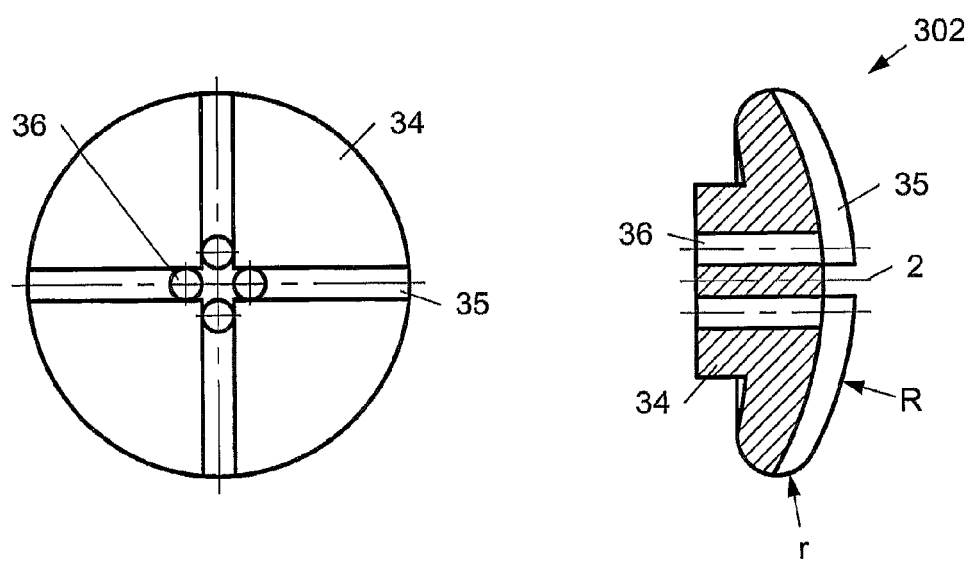
FIG. 27 shows an example of an electrode in a detailed view.

FIG. 27 now shows an advantageous embodiment of an electrode 302 for a spark erosion tool, in particular for a spark erosion tool 101, 102 according to the invention or as a component part thereof in a front view (left) and in cross section (right). The electrode 302 comprises a base body 34 with a section facing a processing front, which has a cylindrical surface or spherical surface. The processing front is shown completely in FIG. 27 in front view, in cross section the ring in the base body 34 with the largest diameter forms the boundary to the processing front. This is to the right in the cross section. Furthermore, the electrode 302 comprises at least one groove 35 arranged in the cylindrical or spherical section, which runs from a middle area of the section to the edge thereof and at least one bore 36, which connects a side of the electrode 302 facing away from the processing front to the at least one groove 35. On the left side the electrode 302 comprises a seat in order to connect it, as shown in the preceding Figures, to the electrode holder 401 ... 417.

In the specific example the cylindrical or spherical section of the electrode 302 in its edge area has a rounding extending at least to the boundary of the processing front, which rounding has a radius r, which is smaller than the radius R of the cylindrical or spherical section. In this way unattractive edges can be avoided in the bore, which may be created when pivoting an angular electrode 301.

In the example shown the radius R of the cylindrical or spherical section is also smaller than or equal to the distance between the axis of rotation of the electrode 302 and the surface of the cylindrical or spherical section. In this way the electrode 302 can be used particularly effectively with a spark erosion tool, in that the electrode 302 can be rotated about an axis of rotation aligned transversely to the a tool longitudinal axis of the spark erosion tool, thus for all spark erosion tools shown in the FIGS. 14 to 21. In the latter the electrode 302 when pivoting slides along an opening already made in the workpiece, that is along its processing front. If the electrode 302 can be displaced relative to the point of rotation along the tool longitudinal axis 2, the radius R of the cylindrical or spherical section is preferably smaller than or equal to the smallest distance between the axis of rotation of the electrode 302 and the surface of the cylindrical or spherical section.

In general, an electrode 302 can be used universally with a spherical section, as the latter can be pivoted about any axis. Preferably, an electrode 302 is used with a cylindrical section, if the latter can only be pivoted about one axis of rotation (see for example FIGS. 14, 18, 20 and 21), wherein the said axis of rotation and the axis of the cylinder are aligned to be parallel or are identical.

Figure 28:
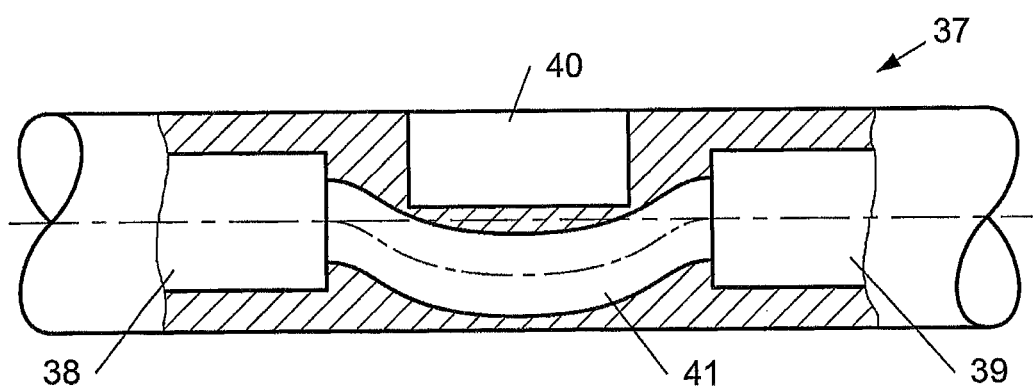
FIG. 28 shows an example of a drill string part with a deflecting bore, which was formed by a spark erosion tool.

FIG. 28 shows an advantageous method for producing a deflecting bore in a drill string part, which connects two flushing bores, preferably using a spark erosion tool 101, 102 of the aforementioned type.

In particular FIG. 28 shows a drill string part 37 with two straight flushing bores 38 and 39 running in one axis, which are configured as blind bores. Furthermore, the drill string part 37 comprises a recess 40. The two flushing bores 38 and 39 are connected by a curved deflecting bore 41 produced by spark erosion. By means of the curved deflecting bore 41 the drill string part 37 is given good mechanical and hydraulic properties (for a liquid flowing inside the drill string part 37).

In particular, such a deflecting bore 41 can be produced effectively with a spark erosion tool 101, 102 of the type according to the invention. A drill string part 37 is usually several meters long and the flushing bores 38 and 39 project suitably far into the drill string part 37. By means of an electrode holder 401 ... 417 it is also possible however to fix the spark erosion tool 101, 102 securely deep in the inside of a drill string part 37 and to move the electrode 301, 302 in a narrow tolerance range.

FIG. 28 shows flushing bores 38 and 39 with the same diameter and running in the same axis. However, this is not absolutely necessary for the production of a deflecting bore 41. Of course, the flushing bores 38 and 39 can also have different diameters and run in different axes. In particular, it is also possible for a flushing bore 38, 39 to be reduced and thereby change from a larger to a smaller diameter or vice versa. Furthermore, it is also possible in particular for a flushing bore 38, 39 to merge into a smaller, axially offset part. Said axially offset parts can in particular lie on the same reference circle and be angularly offset. Lastly, it is also possible for the deflecting bore 41, different from the case shown in FIG. 28, to have the same diameter as the flushing bores 38 and 39.

Finally, it should be noted that the exemplary embodiments show possible embodiment variants and applications of a spark erosion tool according to the invention, whereby it should be noted at this point that the invention is not restricted to the embodiment variants shown in particular, but rather various different combinations of the individual embodiment variants are also possible and this variability, due to the teaching on technical procedure, lies within the ability of a person skilled in the art in this technical field. Thus all conceivable embodiment variants, which are made possible by combining individual details of the embodiment variants shown and described, are also covered by the scope of protection.

In particular, it should be noted that a spark erosion tool can in reality comprise more components than represented.

Finally, as a point of formality, it should be noted that for a better understanding of the structure of the spark erosion tool the latter and its components have not been represented true to scale in part and/or have been enlarged and/or reduced in size.

The problem addressed by the independent solutions according to the invention can be taken from the description.

| List of Reference Numerals | |
|---|---|
| 101, 102 | spark erosion tool |
| 2 | tool longitudinal axis |
| 301, 302 | electrode |
| 401 ... 417 | electrode holder |
| 5 | base body |
| 6 | plate |
| 7 | imaginary hose |
| 801 ... 803 | feed body |
| 9 | electric motor |
| 10 | spindle nut |
| 11 | claw |
| 12 | bellows/expandable body |
| 13 | bellows/expandable body |
| 14 | spindle |
| 15 | wheel |
| 16 | hydraulic/pneumatic cylinder (mounted rigidly) |
| 17 | flexible cable |
| 18 | flexible housing |
| 19 | segment (electrode holder) |
| 20 | clamping ring |
| 21 | tensioning ring |

-continued

| List of Reference Numerals | |
|---|---|
| 22 | flexible hose |
| 23 | segment (feed body) |
| 24 | axis of rotation |
| 25 | rotatably mounted plate |
| 26 | hydraulic/pneumatic cylinder (articulated) |
| 27 | guiding rod |
| 28 | compression spring |
| 29 | cable pull |
| 30 | sleeve |
| 31 | pinion |
| 32 | workpiece |
| 33 | auxiliary body |
| 34 | base body |
| 35 | groove |
| 36 | bore |
| 37 | drill string part |
| 38 | first flushing bore |
| 39 | second flushing bore |
| 40 | recess |
| 41 | curved deflecting bore |

The invention claimed is:

1. A spark erosion tool comprising
an electrode arranged on a tool longitudinal axis,
an electrode holder aligned along and arranged on the tool longitudinal axis and connected to the electrode, and having an electrode holder cross section,
a moving device configured to move the electrode relative to the electrode holder, and
a press connected to or disposed in the electrode holder, the press being configured to apply pressure transversely to the tool longitudinal axis, the press being configured to vary the electrode holder cross section transversely to the tool longitudinal axis.

2. The spark erosion tool as claimed in claim 1, wherein the electrode comprises:
a front side and a back side facing away from the front side, the front side being disposed at a processing front and comprising a cylindrical surface or a spherical surface;
at least one groove arranged in the front side and running from a middle section of the front side to an edge of the front side; and
at least one bore connecting the back side to the at least one groove.

3. The spark erosion tool as claimed in claim 1, wherein the press is formed by extendable and/or outwards pivoting clamping elements/claws.

4. The spark erosion tool as claimed in claim 3, wherein a housing of the electrode holder is elastic and the clamping elements/claws operate through said housing.

5. The spark erosion tool as claimed in claim 1, wherein the press is formed by a pneumatically or hydraulically activated bellows/expandable body.

6. The spark erosion tool as claimed in claim 1, wherein the electrode holder comprises a transport device.

7. The spark erosion tool as claimed in claim 6, wherein the transport device comprises driven wheels.

8. The spark erosion tool as claimed in claim 1, wherein a housing of the electrode holder is flexible and an inner structure of the housing comprises a plurality of rigid segments, which move relative to one another, and
wherein the press and/or the moving device and/or a control unit is arranged in the rigid segments.

9. The spark erosion tool as claimed in claim 1, further comprising a bendable or tubular feed body aligned along the tool longitudinal axis, the feed body being connected to the electrode holder.

10. The spark erosion tool as claimed in claim 9, wherein the feed body comprises a plurality of rigid segments arranged along the tool longitudinal axis, the rigid segments being connected movably to one another.

11. The spark erosion tool as claimed in claim 10, wherein the segments are joined together rotatably via axes of rotation aligned transversely to the tool longitudinal axis, wherein
all axes of rotation are aligned normally to the tool longitudinal axis and parallel to one another or
all axes of rotation are aligned normally to the tool longitudinal axis and two adjacent axes of rotation are each rotated about an angle.

12. The spark erosion tool as claimed in claim 9, wherein the feed body has a constant length along the tool longitudinal axis.

13. The spark erosion tool as claimed in claim 1, wherein the electrode can be moved relative to the electrode holder in the tool longitudinal axis and/or transversely thereto.

14. The spark erosion tool as claimed in claim 1, wherein the electrode can be rotated relative to the electrode holder, and
wherein the axis of rotation is aligned transversely to the tool longitudinal axis.

15. The spark erosion tool according to claim 14, wherein the electrode has a section facing a processing front, the section comprising a cylindrical surface or a spherical surface, and
wherein the radius of the cylindrical or spherical section is smaller than or equal to the distance between the axis of rotation of the electrode and the surface of the cylindrical or spherical section.

16. The spark erosion tool as claimed in claim 1, wherein the moving device comprises at least one actuator connected to the electrode and selected from a group comprising a pneumatic actuator, a hydraulic actuator, a piezo-actuator, and an electromechanical actuator—in the form of a linear or rotation motor respectively.

17. The spark erosion tool as claimed in claim 1, wherein the moving device comprises cable pulls connected to the electrode.

18. The spark erosion tool as claimed in claim 1, further comprising trailing cables arranged in the area of the tool longitudinal axis and connected to the electrode holder, which are used for supplying electrical power to the electrode and/or supplying energy to the electrode holder and/or transmitting control signals to the electrode holder.

19. The spark erosion tool as claimed in claim 1, wherein the electrode can be rotated relative to the electrode holder, and
wherein the axis of rotation is aligned parallel to the tool longitudinal axis or coincides with the tool longitudinal axis.

20. A method for the production of a spark-eroded hole via the spark erosion tool according to claim 1, the method comprising steps of:
a) fixing the electrode holder by applying pressure acting transversely to the tool longitudinal axis in an opening extending in the tool longitudinal axis, the opening having a cross section corresponding essentially to the electrode,
b) switching on the erosion voltage, c) moving the electrode relative to the electrode holder towards a processing front,
d) switching off the erosion voltage,
e) moving the electrode relative to the electrode holder away from the processing front,
f) releasing the electrode holder by reducing the said pressure acting transversely to the tool longitudinal axis, and
g) moving the electrode holder in the direction of the processing front and repeating the steps a) to g).

21. The method as claimed in claim 20, wherein before step a) an auxiliary body with an opening extending in the tool longitudinal axis, which has a cross section corresponding essentially to the electrode, is fixed in the area of the hole to be produced and the electrode holder is positioned in the said opening with an electrode pointing towards the workpiece.

22. The method as claimed in claim 20, wherein the said opening, in which the electrode holder is fixed, was made by the electrode.

23. The method as claimed in claim 20, wherein the produced processing contour is processed further after the spark erosion by machining or non-machining processing methods.

24. Method for the production of a deflecting bore in a drill string part, which connects two straight flushing bores, wherein the deflecting bore is made to be curved by spark erosion using the spark erosion tool according to claim 1.

25. The method as claimed in claim 24, wherein the deflecting bore is produced by
a) fixing the electrode holder by applying pressure acting transversely to the tool longitudinal axis in an opening extending in the tool longitudinal axis, which has a cross section corresponding essentially to the electrode,
b) switching on the erosion voltage,
c) moving the electrode relative to the electrode holder towards a processing front,
d) switching off the erosion voltage,
e) moving the electrode relative to the electrode holder away from the processing front,
f) releasing the electrode holder by reducing the said pressure acting transversely to the tool longitudinal axis, and
g) moving the electrode holder in the direction of the processing front and repeating the steps a) to g).

26. A spark erosion tool comprising
an electrode arranged on a tool longitudinal axis, and
an electrode holder aligned along the tool longitudinal axis, arranged on the electrode, connected to the electrode, and comprising a transport device and a first segment and a second segment that can be moved against one another in the tool longitudinal axis,
wherein at least one of the first segment and the second segment comprises a respective moving device configured to move the electrode relative to the electrode holder, and
wherein at least one of the first segment and the second segment comprises a respective press configured to apply pressure transversely to the tool longitudinal axis.

27. A spark erosion tool comprising
an electrode arranged on a tool longitudinal axis,
an electrode holder aligned along and arranged on the tool longitudinal axis and connected to the electrode, and having an electrode holder cross section, the electrode holder comprising a press configured to apply pressure transversely to the tool longitudinal axis, the press being configured to vary the electrode holder cross section transversely to the tool longitudinal axis, and
a moving device configured to move the electrode relative to the electrode holder.

* * * * *